United States Patent Office 2,938,035
Patented May 24, 1960

2,938,035
CYANO-VINYLPYRIDINES

Francis E. Cislak, Indianapolis, Ind., assignor to Reilly Tar & Chemical Corporation, Indianapolis, Ind., a corporation of Indiana No Drawing. Filed Dec. 22, 1958, Ser. No. 781,830

6 Claims. (Cl. 260—294.9)

This invention relates to new chemical compounds and to the process of making them. More particularly, it relates to cyano-vinylpyridines having the structural formula:

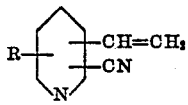

where R is hydrogen, lower alkyl, benzyl, or substituted benzyl.

In general, the compounds of my invention may be prepared by the dehydration of a cyano-ethanolpyridine. The equation below depicts the preparation of 2-vinyl-5-cyano-pyridine from 2-ethanol-5-cyanopyridine:

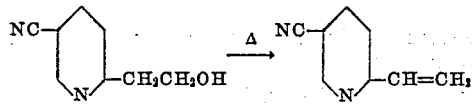

The dehydration may be accomplished by vaporizing the cyano-ethanolpyridine through a non-acid dehydrating catalyst maintained at a dehydrating temperature. As suitable dehydrating temperatures, I have found temperatures above the boiling point of water, preferably above about 150° C. and more desirably above about 175° C.

The cyano-ethanolpyridines used in my present invention are new compounds.

My cyano-vinylpyridines are useful in the preparation of polymers and co-polymers. The presence of the cyano groups in the resin matrix makes these polymers of interest as adhesives.

Illustrative of how my cyano-vinylpyridines may be converted into polymers, I cite the following. The parts are by weight. Into a suitable reaction vessel provided with means for stirring and cooling, the following materials are charged:

| | Parts |
|---|---|
| 2-vinyl-5-cyanopyridine | 60 |
| Potassium persulfate | 0.6 |
| Sodium lauryl sulfate | 0.6 |
| Distilled water | 180 |

While stirring, the temperature was slowly raised to about 40° C. At this temperature, the polymerization was continued for about 18 hours. The white emulsion of polymer formed during this period was removed, coagulated, filtered, and dried.

My cyano-vinylpyridines may be used to make copolymers with acrylonitrile, styrene, butadiene, and other monomers.

The hydrolysis of my cyano-vinylpyridines, as with caustic soda may be regulated to give vinylpyridine carboxylic acids or the corresponding amides:

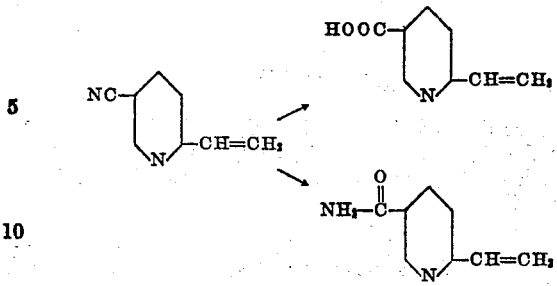

My invention will be described more fully in conjunction with the following specific examples. It should be understood, however, that these examples are given by way of illustration only, and that my invention is not to be limited by the details set forth therein.

EXAMPLE 1

*2-vinyl-5-cyanopyridine*

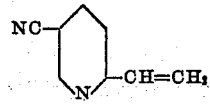

I vaporize 2-ethanol-5-cyanopyridine, mix it with an inert gas, such as nitrogen, if desired, and pass it through a suitable reactor containing an alumina dehydrating catalyst. The reactor is maintained under partial vacuum and at a temperature of from about 200° C. to about 400° C. As the 2-ethanol-5-cyanopyridine passes through the reactor, it is converted to 2-vinyl-5-cyanopyridine and water. The vapors of 2-vinyl-5-cyanopyridine, water, any diluent gas if present, and any unchanged 2-ethanol-5-cyanopyridine are promptly removed from the reactor and are quickly condensed, cooled, collected in a suitable receiver, and inhibited to retard polymerization.

The 2-vinyl-5-cyanopyridine is separated from the water and any unreacted 2-ethanol-5-cyanopyridine in any convenient manner. One way of separating the 2-vinyl-5-cyanopyridine is by means of vacuum flash distillation.

In place of the alumina, I may use a large number of dehydrating catalysts, such as alkali metal hydroxides, silica-alumina, and the like.

EXAMPLE 2

*2-vinyl-5-cyanopyridine*

I vaporize a mixture composed of one mole of 2-methyl-5-cyanopyridine and one mole of formaldehyde and pass the vapors through a suitable reactor containing a fluidized catalytic bed of alumina (H–41). The reactor used is of the type normally used in carrying out cracking operations in the petroleum industry. Such reactors are of tubular form with suitable connections at entrance and exit. They are provided with means for supporting the fluid bed of catalyst, and are provided with any convenient means for heating them. My reactor is maintained at a temperature of about 275° C. The vapors are passed through the catalyst at a superficial velocity of about 0.9 foot per second. As the mixture of 2-methyl-5-cyanopyridine and formaldehyde passes through the reactor, a reaction occurs whereby 2-vinyl-5-cyanopyridine is formed. The vapors of the unchanged reactants and the reaction products are promptly taken out of the reactor and are promptly condensed, cooled, and collected in a suitable receiver. The 2-vinyl-5-cyanopyridine is separated from the unreacted 2-methyl-5-cyanopyridine, formaldehyde, and other reaction products in any suitable manner, as, for example by fractional distillation under vacuum.

EXAMPLE 3

*2-vinyl-4-cyanopyridine*

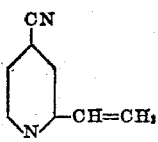

The procedure of Example 1 is repeated with the exception that I use 2-ethanol-4-cyanopyridine in place of the 2-ethanol-5-cyanopyridine and recover 2-vinyl-4-cyanopyridine.

EXAMPLE 4

*2-cyano-4-vinylpyridine*

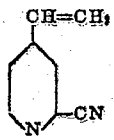

The procedure of Example 1 is repeated with the exception that I use 2-cyano-4-ethanolpyridine in place of 2-ethanol-5-cyanopyridine and recover 2-cyano-4-vinylpyridine.

EXAMPLE 5

*2-vinyl-3-cyanopyridine*

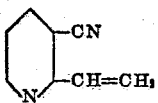

The procedure of Example 1 is repeated with the exception that I use 2-ethanol-3-cyanopyridine in place of 2-ethanol-5-cyanopyridine and recover 2-vinyl-3-cyanopyridine.

EXAMPLE 6

*2-vinyl-6-cyanopyridine*

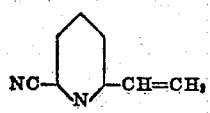

The procedure of Example 1 is repeated with the exception that I use 2-ethanol-6-cyanopyridine in place of 2-ethanol-5-cyanopyridine and recover 2-vinyl-6-cyanopyridine.

EXAMPLE 7

*2-vinyl-4-cyano-6-methylpyridine*

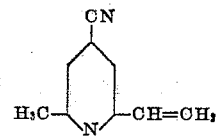

The procedure of Example 1 is repeated with the exception that I use 2-ethanol-4-cyano-6-methylpyridine in place of 2-ethanol-5-cyanopyridine and recover 2-vinyl-4-cyano-6-methylpyridine.

EXAMPLE 8

*3-vinyl-5-cyanopyridine*

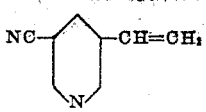

The procedure of Example 1 is repeated with the exception that I use 3-(1-ethan-1-ol)-5-cyanopyridine in place of 2-ethanol-5-cyanopyridine and recover 3-vinyl-5-cyanopyridine.

I claim as my invention:

1. A compound of the class consisting of cyanovinylpyridines having the general formula:

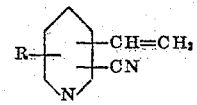

where R is selected from the group consisting of hydrogen and lower alkyl.

2. 2-vinyl-5-cyanopyridine.
3. 2-vinyl-4-cyanopyridine.
4. 2-vinyl-3-cyanopyridine.
5. 2-vinyl-6-cyanopyridine.
6. 3-vinyl-5-cyanopyridine.

No references cited.